US008181022B2

(12) United States Patent
Meyerson

(10) Patent No.: US 8,181,022 B2
(45) Date of Patent: May 15, 2012

(54) METHOD AND APPARATUS FOR CONTROLLING ACCESS RESTRICTIONS FOR MEDIA PLAYBACK

(75) Inventor: Randy Meyerson, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 2252 days.

(21) Appl. No.: 10/877,955

(22) Filed: Jun. 24, 2004

(65) Prior Publication Data
US 2005/0038996 A1 Feb. 17, 2005

Related U.S. Application Data

(60) Provisional application No. 60/482,424, filed on Jun. 24, 2003.

(51) Int. Cl.
*H04L 9/00* (2006.01)
(52) U.S. Cl. ............ 713/165; 713/153; 713/171; 726/4; 726/6; 726/26; 726/28; 726/30; 380/205; 380/241
(58) Field of Classification Search ............ 726/30; 713/165
See application file for complete search history.

(56) References Cited

U.S. PATENT DOCUMENTS

| | | | | |
|---|---|---|---|---|
| 5,696,898 A * | 12/1997 | Baker et al. | ............ | 726/12 |
| 5,721,803 A | 2/1998 | Haraguchi | | |
| 5,974,217 A | 10/1999 | Haraguchi | | |
| 6,389,467 B1 | 5/2002 | Eyal | | |
| 6,574,609 B1 * | 6/2003 | Downs et al. | ............ | 705/50 |
| 6,782,550 B1 * | 8/2004 | Cao | ............ | 725/39 |
| 7,200,863 B2 * | 4/2007 | Shuster | ............ | 726/4 |
| 7,281,054 B2 * | 10/2007 | Ishioka et al. | ............ | 709/231 |
| 7,370,365 B2 * | 5/2008 | Carroll et al. | ............ | 726/28 |
| 7,650,621 B2 * | 1/2010 | Thomas et al. | ............ | 725/87 |
| 2001/0037459 A1 * | 11/2001 | Ogawa et al. | ............ | 713/200 |
| 2003/0005333 A1 * | 1/2003 | Noguchi et al. | ............ | 713/201 |
| 2003/0097564 A1 * | 5/2003 | Tewari et al. | ............ | 713/171 |
| 2004/0015723 A1 * | 1/2004 | Pham et al. | ............ | 713/201 |
| 2004/0107342 A1 * | 6/2004 | Pham et al. | ............ | 713/165 |
| 2004/0166834 A1 * | 8/2004 | Omar et al. | ............ | 455/414.1 |
| 2004/0261099 A1 * | 12/2004 | Durden et al. | ............ | 725/32 |

* cited by examiner

*Primary Examiner* — Kambiz Zand
*Assistant Examiner* — Amare F Tabor
(74) *Attorney, Agent, or Firm* — ÆON Law; Adam L.K. Philipp

(57) ABSTRACT

A method and apparatus for controlling access restrictions for media resource playback may include defining a user-specific content control profile authorizing one or more classes of content to be delivered to a client device, generating a media resource request identifying a first media resource associated with a first class of content and one or more attributes of the content control profile, determining whether the first class of content has been authorized for delivery to the client device based at least in part upon the one or more attributes of the content control profile, and delivering the first media resource to the client device if the first class of content has been authorized for delivery to the client device.

40 Claims, 7 Drawing Sheets

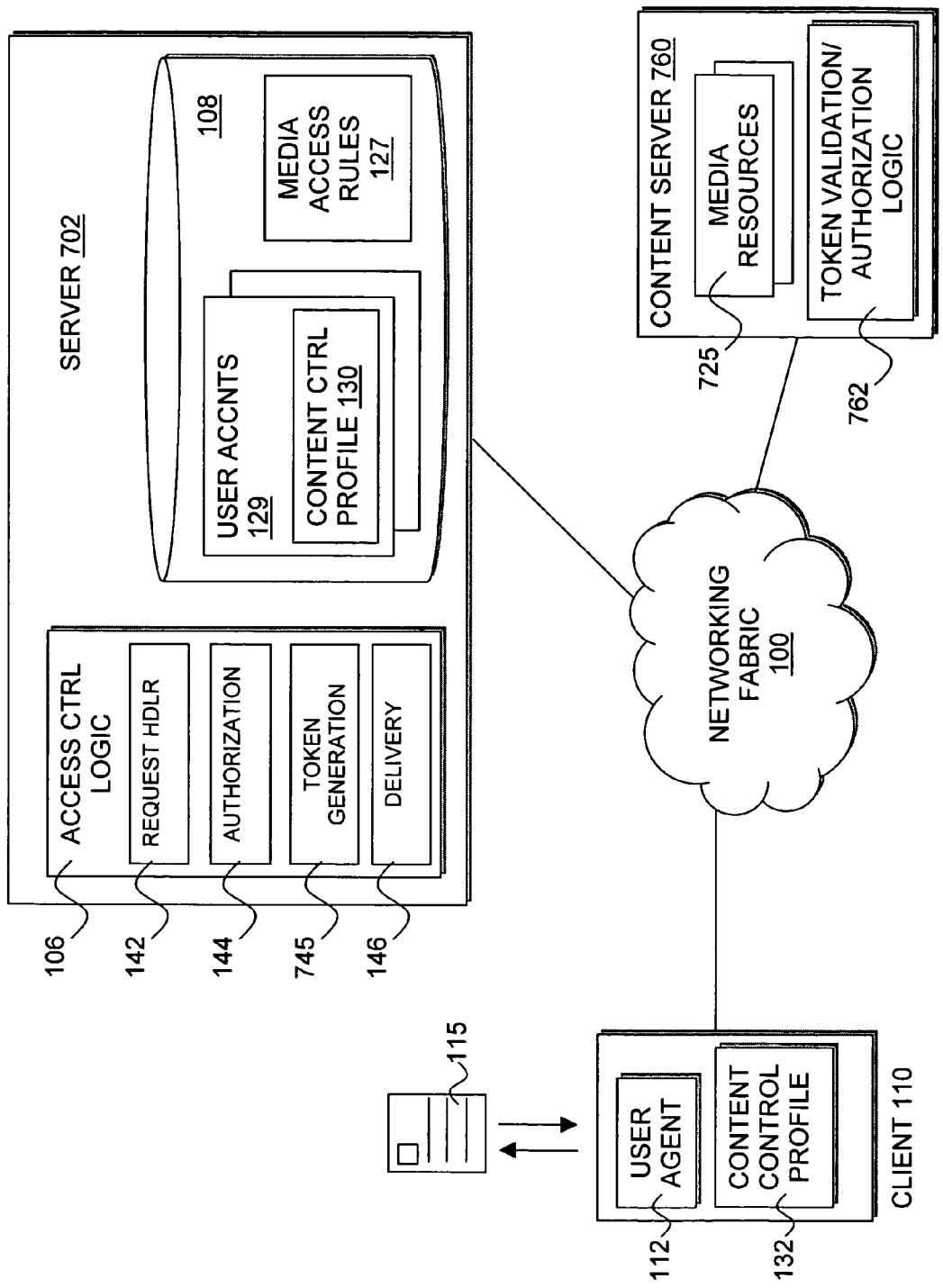

METHOD AND APPARATUS FOR CONTROLLING ACCESS RESTRICTIONS FOR MEDIA PLAYBACK

RELATED APPLICATION

This application claims the benefit of U.S. Provisional Application No. 60/482,424 filed on Jun. 24, 2003.

BACKGROUND OF THE INVENTION

1. Field of the Invention

The present invention relates generally to the field of computing. More specifically, the present invention relates to a method and apparatus for controlling access restrictions for media playback.

2. Background Information

With advances in integrated circuit, microprocessor, networking and communication technologies, an increasing number of digital computing devices are being networked together to facilitate the exchange of electronic information. Accordingly, traditional audio and video content providers such as radio and television studios, recording associations, independent recording artists, and so forth, are turning to digital communication networks such as the Internet for dissemination and distribution of media content.

Given the wide variety of media content available on the Internet, coupled with the wide spectrum of principles and beliefs held by individuals and/or groups of people, it is easy to understand that much media content may, at one time or another, be found to be objectionable by someone for one reason or another. Knowing this, parents have become sensitive to the types of media content their children wish to view or access through e.g. the family computer. Accordingly, parents have begun to limit or even block their children's access to certain web sites deemed "objectionable" by the parents for one reason or another.

Current methods for filtering/limiting access to media content on the Internet apply an "all or nothing" approach, whereby entire web sites or entire web pages within one or more web sites are blocked from being accessed by the requesting device. Although these wholesale blocking techniques may work adequately when applied to content providers known to contain a large portion of media content that may be deemed objectionable, it is not always easy to identify what content may be objectionable based solely upon the source of the content. For example, a content provider may offer a wide array of media content ranging from cartoons and educational shows, to nightly news broadcasts that may often portray violence. Although the children's programming may be welcomed within a home having children, the violence may nevertheless be unwanted.

BRIEF DESCRIPTION OF DRAWINGS

The present invention will be described by way of exemplary embodiments, but not limitations, illustrated in the accompanying drawings in which like references denote similar elements, and in which:

FIG. 6 illustrates an example data structure suitable for storing media access rules, in accordance with one embodiment of the invention;

FIG. 7 illustrates an example environment to facilitate multiple entity control of access restrictions for media playback, in accordance with one embodiment of the invention.

DETAILED DESCRIPTION OF EMBODIMENTS OF THE INVENTION

The present invention describes a method and apparatus for controlling access restrictions for media playback. In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

Figure 1:
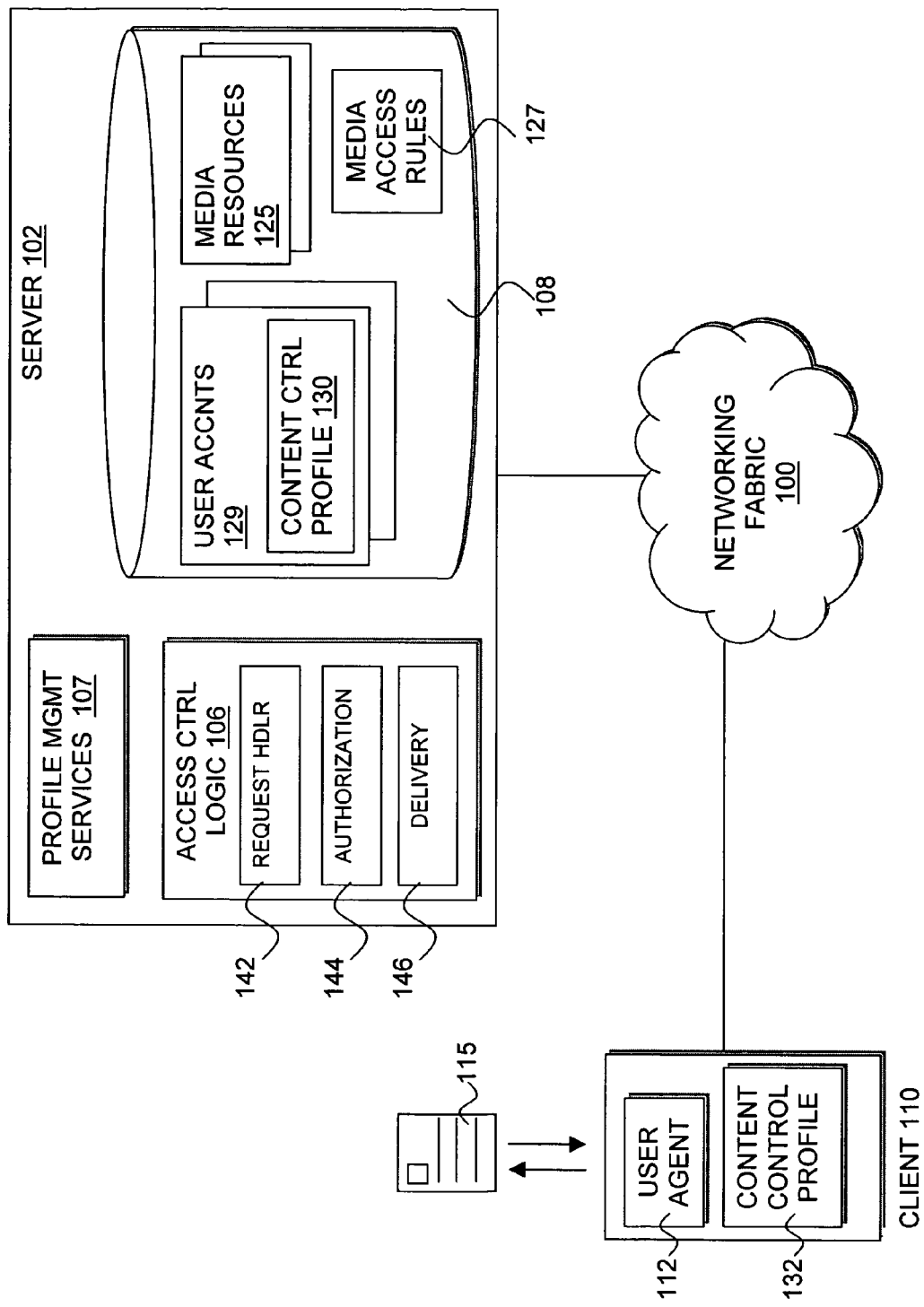
FIG. 1 illustrates an environment for controlling access restrictions to media resources, in accordance with one embodiment.

FIG. 1 illustrates an environment for controlling access restrictions to media resources, in accordance with one embodiment. As illustrated, server 102 and client 110 are communicatively coupled via networking fabric 100 which may represent one or more interconnected data networks, such as, but not limited to the Internet or World Wide Web. Client 110 and server 102 may each represent a broad range of digital systems known in the art, including but not limited to devices such as wireless mobile phones, palm sized personal digital assistants, notebook computers, desktop computers, set-top boxes, and game consoles. In one embodiment, server 102 may provide one or more requested media resources 125 to client 110, based upon one or more content control attributes contained in content control profile 132 originally specified by a user via user account 129.

Client 110 may be equipped with a user agent (112) such as a web browser or media rendering/player application, to access electronic document/web page 115 to view content containing references to media resources, and to formulate and transmit network requests for media resources to server 102. For example, client 110 may generate (via user agent 112) a media resource request in response to a user indicating their desire to access a particular media resource associated with electronic document/web page 115 and displayed via user agent 112. The terms "media resource" and "media content" are each interchangeably intended to broadly refer to digital or analog data such as, but not limited to audio and video (including motion video and still images) clips, files, and streams, whether alone or combined, that may be accessible by a user agent/client.

Server 102 may be equipped with profile management services 107, access control logic 106, and data store 108. Data store 108 may represent one or more volatile or non-volatile data storage mechanisms/devices that may be internal or external to server 102. In one embodiment, data store 108 may contain stored user accounts 129 and corresponding user-specific content control profiles 130, as well as media access rules 127 and media resources 125. In one embodiment, a user may access profile management services 107 of server 102 to create and/or manage a content control profile authorizing one or more classes of media content for delivery to client 110. In one embodiment, media access rules 127 may associate media resources, such as media resources 125 stored in data store 108, with appropriate classes of media content. In one embodiment, requested media resources that are determined to be associated with an authorized class of media content may be delivered to client 110, whereas requested media resources that are determined to be associated with a non-authorized class of media content may not be delivered to client 110. In one embodiment, a local representation of content control profile 130, including one or more content control attributes, may be stored on client 110 for use by client 110 in generating requests for delivery of media resources. In one embodiment of the invention, access control logic 106 may contain request handler 142, authorization logic 144, and delivery engine 146 to facilitate server 102 in receiving media resource requests from client devices, determining whether the requested media resource should be delivered to the requesting clients, and delivering the requested media resource or facilitating the delivery of the requested media resource by another server.

In accordance with one embodiment of the invention, server 102 may receive media resource requests from client 110 that include one or more attributes of content control profile 132. In one embodiment, access control logic 106 may determine whether the requestor (e.g. client 110) is entitled to access the requested media resource (e.g. based upon media access rules 127), and whether the content class associated with the requested media resource has been authorized by the user to be delivered to the requestor (e.g. based upon one or more attributes of content control profile 132). The term "requestor" is used herein to broadly refer to an originator of a media resource request including but not limited to a device such as client 110, a software component or application such as user agent 112, an individual such as the requesting user operating client 110 that initiates a media resource request, and so forth.

Content Control Profile

Figure 2:
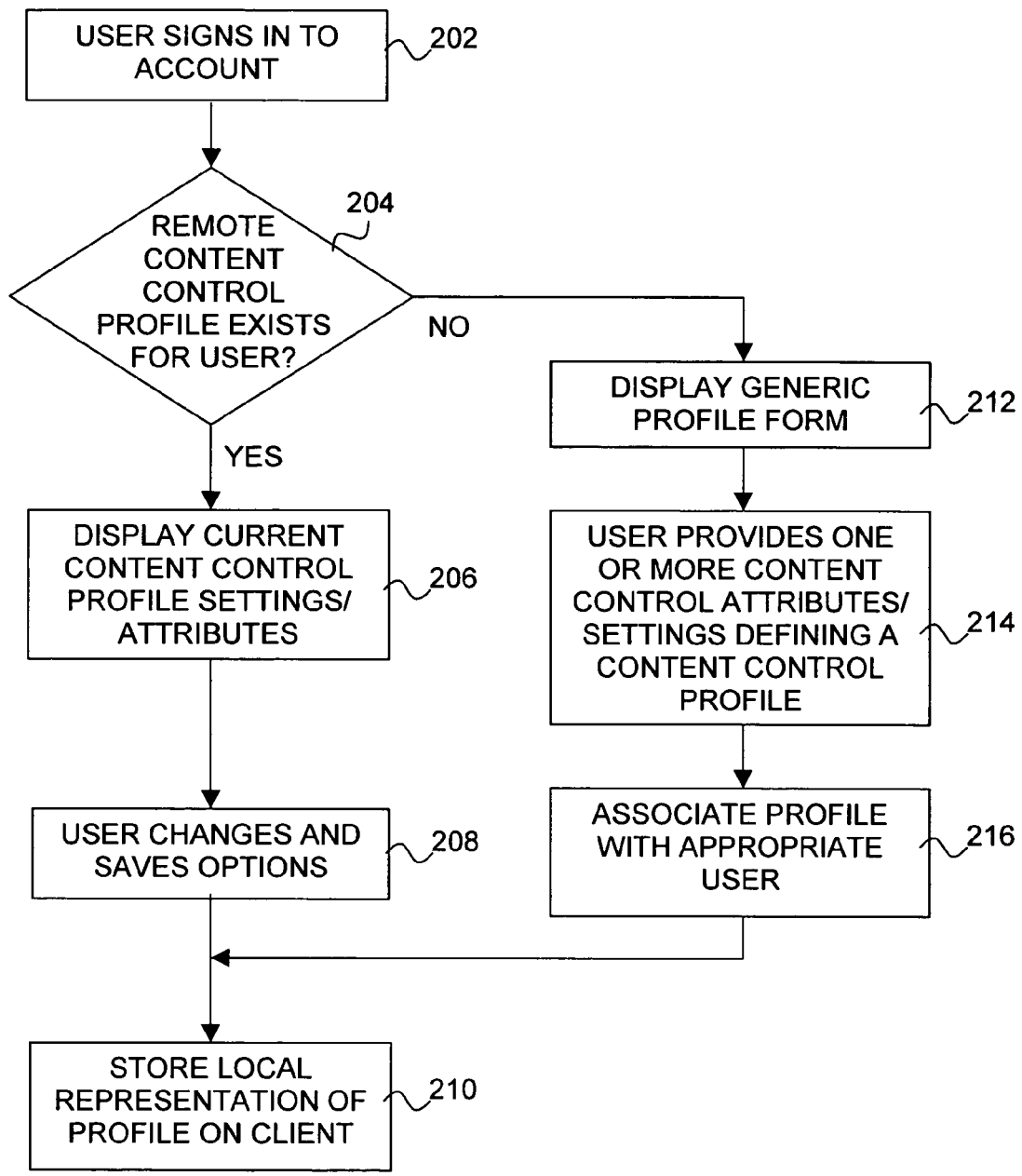
FIG. 2 is a flow diagram illustrating an example operational flow for one embodiment of the profile management services of FIG. 1.

In one embodiment of the invention, server 102 may be equipped with profile management services 107 to facilitate in the creation and management of user-specific content control profiles. FIG. 2 is a flow diagram illustrating an example operational flow for profile management services 107, in accordance with one embodiment of the invention.

As shown, the content control profile management process may begin by a user signing-in to an existing user account (129) on server 102, block 202. In response, profile management services 107 may then make a determination as to whether a corresponding remote content control profile, such as content control profile 130, exists for the user, block 204. If so, profile management services 107 may effect the graphical and/or textual display of the user's current content control profile, block 206, and further enable a user to update and save changes to their content control profile, block 208. Thereafter, a representation including one or more content control attributes of the updated content control profile may be stored locally on the user's client for use by the client in generating a media resource request, block 210.

If, however, at block 204 it is determined that a corresponding remote content control profile corresponding to the user does not already exist, profile management services 107 may cause a generic content control profile to be displayed, block 212. In turn, the user may choose to define a new content control profile by providing one or more content control attributes/settings, block 214. In response, the content control profile may then be associated with the appropriate user account 129 (block 216), and a local representation of the newly created content control profile may be stored on the user's client, block 210.

Figure 3:
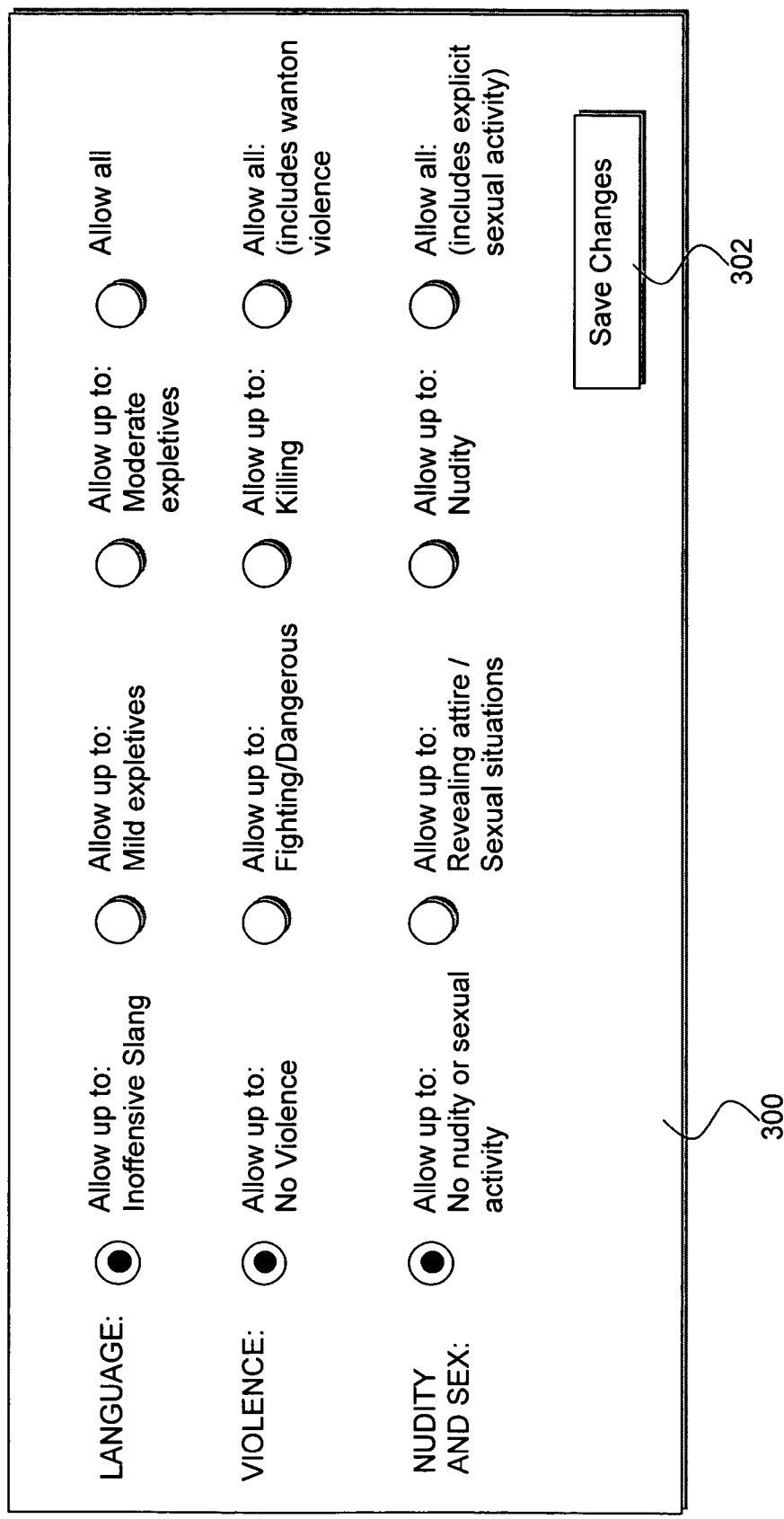
FIG. 3 illustrates an example graphical interface to facilitate management of a remote content control profile by a user, in accordance with one embodiment of the invention.

FIG. 3 illustrates an example graphical interface to facilitate management of a remote content control profile by a user, in accordance with one embodiment of the invention. In one embodiment, profile interface 300 may provide an arbitrary number of content control vectors through which a user may define the classes of content that they wish to authorize to be delivered to a client device. In the illustrated embodiment, profile interface 300 contains three content qualification vectors (Language, Violence, and Nudity), each having four decreasingly restrictive levels of control. It should be noted, however, that the levels of control may be definable based on arbitrary granularities.

For example, the content control attributes of profile interface 300 indicate that a user has chosen to allow the delivery of media resources that at a maximum may contain slang language, no violence and no nudity or sexual activity. However, a user could have elected to allow the delivery of any media resource regardless of the type of language used, the amount of violence portrayed and/or the amount of nudity/sexual activity shown. In one embodiment, profile interface 300 may further provide facilities for a user to save changes made to a given content control profile. In one embodiment, profile interface 300 may be implemented as an HTML Form whose values (e.g. as determined by the user-selected content control attributes/settings) may be submitted to a server, such as server 102 indicated as part of the HTML Form implementing code, in response to the user electing to save any changes made to the form using e.g. "save changes" button 302.

In one embodiment, the local representation of the content control profile may be transmitted to the client as a block of extensible markup language (XML) based data that causes an HTTP cookie to be written and stored on the client. In one embodiment, the local content control profile may contain any or all content control attributes defined in the content control profile via e.g. profile interface 300. For example, a partial XML structure that may be used by profile management services 107 to store a local representation of the content control profile specified in FIG. 3 might appear as follows:

```
<Language>      L0      </Language>
<Violence>      V0      </Violence>
<Nudity>        N0      </Nudity>;
``` where L0, V0, and N0 may each represent a particular content control attribute used in defining a class of content.

The Request

As mentioned above, client 110 may request delivery of a particular media resource from server 102. The requested media resource may, for example, be identified by one or more uniform resource indicators (URIs) or one or more uniform resource locators (URLs). In one embodiment, a URL used to request a media resource may take the following form:

"PROTOCOL://<HOST>:<PORT>/
<PATH>?<SEARCHPART>";

Where the <protocol> field tells the server how to retrieve the requested resource, the <host> field represents the fully qualified domain name of a network host such as server 102, or its IP address, and the <port> field indicates the port number to connect to on the host. The remainder of the locator consists of the "URL-Path", which supplies the details of how the specified resource can be accessed on the host. In addition, the <searchpart> is a query string that may be used to pass information to the <host>. In one embodiment, the <searchpart> of a URL contained within electronic document 115 may contain a content or partner identifier (i.e. PID) that indicates (whether directly or indirectly) a particular content class to which the associated resource belongs.

The term "content class" is used herein to broadly describe a logical or physical grouping of information or media content into one or more categories. The classification categories may be predefined by e.g. a content provider or other party, or the classification categories may be arbitrarily and/or dynamically defined based on one or more criteria, for example. In one embodiment, each media resource may be classified into one or more content classes or categories, and assigned a PID to facilitate identification of the assigned content class by server 102. In one embodiment, each content directory may be represented by a unique PID.

In one embodiment, the requested media resource may further be identified by one or more uniform resource indicators (URIs) or one or more uniform resource locators (URLs) that are associated with an HTML "Form". For example, an HTML Form used to submit a request to server 102 may contain an ACTION attribute indicating a URI/URL associated with the requested media resource, a METHOD attribute indicating the type of method to use when submitting the data (e.g. whether it be a GET or POST method), an ENCTYPE attribute used to specify the media type used to encode the name/value pairs for transport, and a variety of optional INPUT attributes that enable Form customization to facilitate data collection.

To access a particular media resource, a user might, for example, select (via a user input device) a hypertext link displayed within electronic document 115 that corresponds to the particular media resource 125 stored on server 102. In response, the corresponding user agent might then generate and transmit an HTTP request to server 102 having the following format:

```
[METH] [REQUEST-URI] HTTP / [VER]
[fieldname1] : [field-value1]
[fieldname2] : [field-value2]
[Request body, if any]
```

In such a request, "METH" is used to indicate the request method (e.g. "GET" or "POST"), the "REQUEST-URI" field identifies the requested resource on the server, and "VER" indicates the version of HTTP used. If a GET method is used, the Form data is typically sent to the server with a "?" followed by the form_data appended to the URI specified in the ACTION attribute, whereas with a POST method, the Form data is typically sent in the body of the request. Furthermore, the fieldname/field-value pairs represent header fields through which the user agent may additionally provide the server with requestor-specific attributes such as the name of the requesting user, the type and version of user agent employed, authorization information such as passwords and encryption keys, requestor entitlements/authorizations, one or more attributes associated with a content control profile, and so forth.

In one embodiment, the requestor-specific attributes may be submitted to the host (e.g. example server 102) in the form of an HTTP "Cookie". In such an embodiment, the user agent may first compare the selected URI/URL with a list of Cookies stored on the client. If a match is found, a line containing the name/value pairs of matching cookies may then be included in the HTTP request. For example, an HTTP request that includes a URI/URL that matches a cookie might be formed as: Cookie: Name1=Opaque_String1; Name2=Opaque_String2, where any opaque string may be used to indicate the requestor-specific and/or content control attributes as described above.

Figure 4:
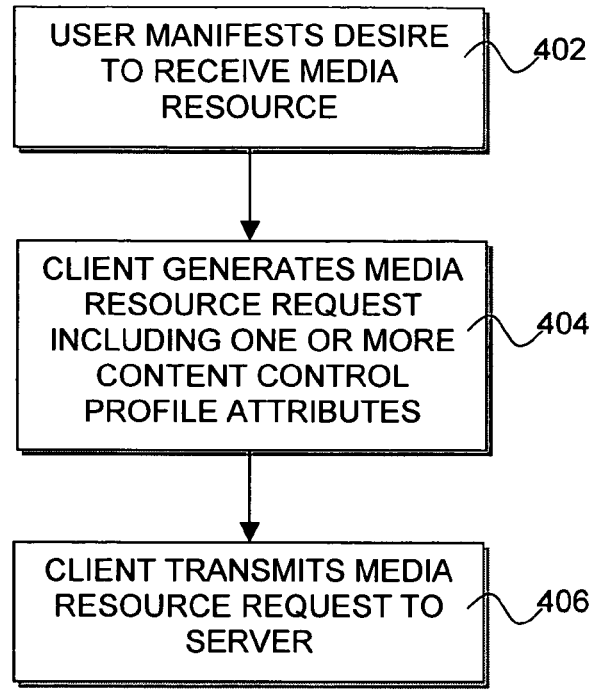
FIG. 4 is a flow diagram illustrating an example operational flow for the generation of a media resource request, in accordance with one embodiment of the invention.

FIG. 4 illustrates a flow diagram for the generation of a media resource request, in accordance with one embodiment of the invention. As shown, the process may begin with a user indicating their desire to receive a media resource, block 402. In one embodiment, the user may manifest such a desire by selecting, via e.g. a user input device, a hypertext link associated with the desired media resource from an electronic document/web page 115. In response, the corresponding requestor (e.g. client 110 or a software requestor) may generate a media resource request (such as an HTTP based request) that includes one or more content control attributes of a corresponding content control profile, block 404. Thereafter, the requester may transmit the resource request to a server such as server 102, block 406.

Access Control Logic

Figure 5:
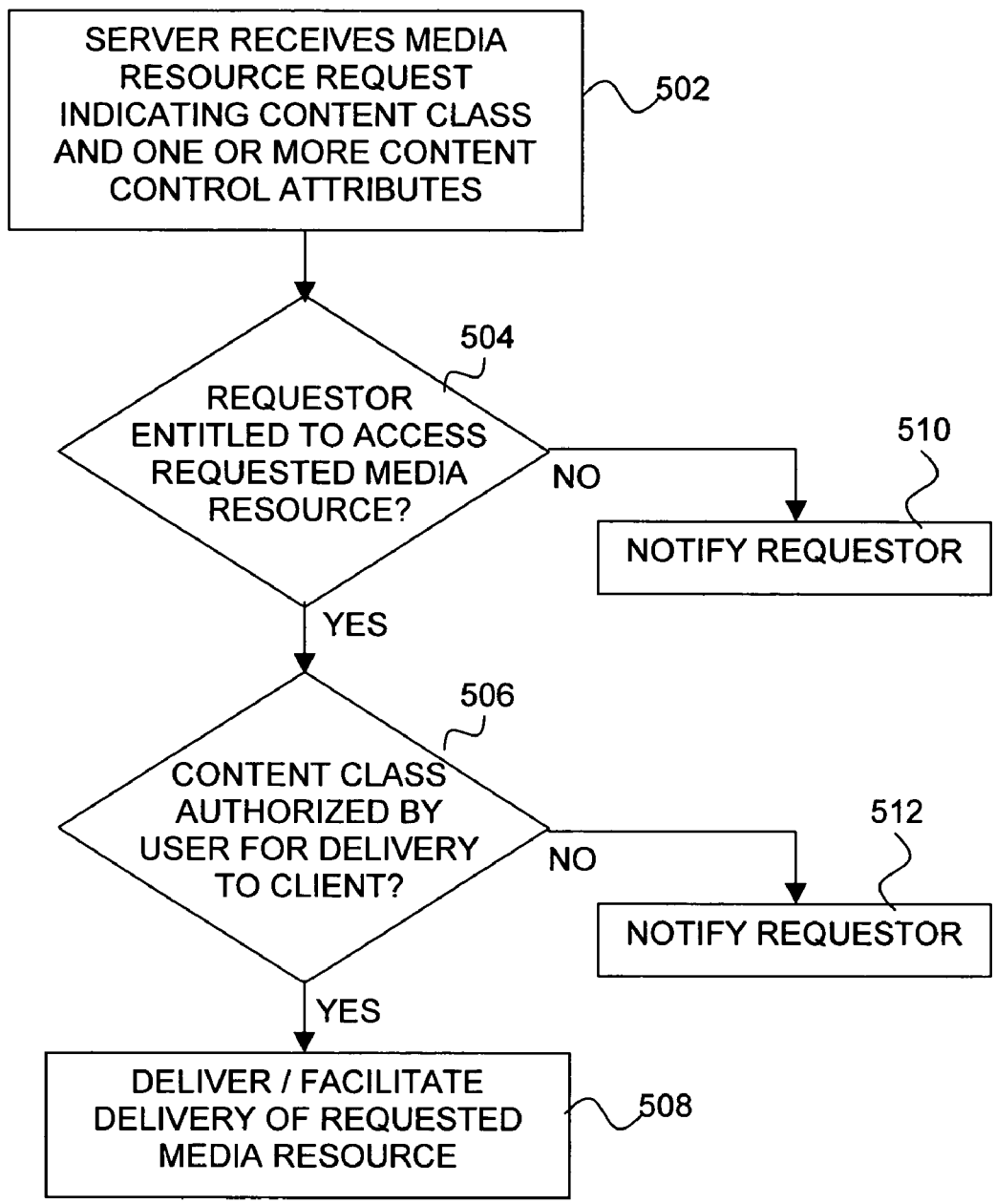
FIG. 5 is a flow diagram illustrating an operational flow for one embodiment of access control logic 106 of FIG. 1.

FIG. 5 is a flow diagram illustrating an operational flow for one embodiment of access control logic 106 of FIG. 1. In one embodiment, request handler 142 may receive media resource requests for the delivery of media resources stored e.g. in data store 108, where the requests may identify (either directly or indirectly) a particular media resource, a content class to which the indicated media resource belongs, one or more requestor-specific attributes, and one or more content control attributes, or any combination thereof, block 502. The media requests may be formed in accordance with a variety of communication protocols and/or application-specific message formats such as HTTP, the real time streaming protocol (RTSP), the file transfer protocol (FTP), and so forth. In one embodiment, request handler 142 may be an HTTP daemon that waits for HTTP based requests from web clients such as client 110 equipped with user agent 112.

In one embodiment, authorization logic 144 determines whether or not the requestor is entitled to access the requested media resource based upon the content class to which the media resource belongs and/or an entitlement level associated with the requestor, block 504. In one embodiment, authorization logic 144 may access one or more media access rules 127 to make such a determination. In one embodiment, authorization logic 144 may compare the entitlement level associated with the requester with an entitlement level associated with the content class of the requested media resource. If the entitlement level associated with the requestor is less than the entitlement level associated with the media resource, the requestor may be deemed as not authorized to access the stored media resource and the requestor is notified accordingly, block 510. However, if the entitlement level associated with the requestor is greater than or equal to the entitlement level associated with the media resource the requestor may be deemed authorized to access the stored media resource.

A further determination may then be made as to whether the requested media resource belongs to a class of media that has been authorized by the user for delivery to the requesting client device, block 506. In one embodiment, such a determination may be made based upon a comparison between one or more content control attributes (e.g. transmitted to server 102 in association with the media resource request), and access control information associated with the particular class of media corresponding to the requested media resource. If it is determined that the requested media resource is associated with a class of media that has not been authorized by the user for delivery to the requesting client device, the requestor is notified accordingly, block 512. However, if it is determined that the requested media resource is associated with a class of media that has been authorized by the user for delivery to the requesting client device, delivery engine 146 may then deliver the requested media resource, or facilitate delivery of the requested media resource to the requesting client/requestor, block 508. In one embodiment, delivery engine 146 may stream media resources to recipients thereby allowing playback of a media resource to begin before the entire media resource is received. In another embodiment, delivery engine 146 may deliver the media resources to the requester as static data files, whereby the entire media resource is received prior to playback of the media resource beginning.

Although server 102 of FIG. 1 is shown to include the various components/logic blocks described above, it should be noted that the functionality of one or more of request handler 142, authorization logic 144, and delivery engine 146 may be combined into fewer functional blocks than that pictured, or may be further subdivided into additional functional components/logic blocks without departing from the spirit and scope of the invention. For example, although request handler 142 is shown to be part of access control logic 106, the functionality of request handler 142 may instead be incorporated into the networking protocol stack of server 102.

Example Data Structure

FIG. 6 illustrates an example data structure suitable for storing media access rules in accordance with one embodiment of the invention. As shown, table 600 includes a number of entries/records, with each entry including a content/partner identifier (PID) 602 for use in identifying a particular class of media content, an authorization code (AUTH) 604 for use in identifying an entitlement level associated with the corresponding content class, a host address 605 indicating a location where media resources associated with the particular media content class may be stored (described below), and one or more access control codes 606 for use in identifying content attributes associated with the class of media content indicated by the corresponding content/partner identifier 602.

A variety of comparison criteria may be used to determine the relationships between the various entitlement levels as well as relationships between content control attributes and access control codes. Moreover, the entitlement levels, content control attributes, and access control codes need not necessarily be identified by numeric or alphanumeric representations, although they may.

Multiple Entity Control of Access Restrictions

In the description above, various embodiments are described in which access restrictions for media playback are controlled by a first entity via server 102, for example. In other embodiments, however, access restrictions for media playback may be controlled or influenced through interactions of multiple entities, whether the entities represent businesses, loosely affiliated groups of people, individuals, and so forth.

For example, profile management services 107 may be hosted by one or more separate web servers operated by a third-party entity that may be operationally independent from the hosting of access control logic 106, media resources 125 and/or access rules 127. Similarly, media resources 125 may be hosted by one or more content servers operated by a third-party content provider that also may be operationally independent from the hosting of access control logic 106, and/or access rules 127. The term "operationally independent" is intended to refer to the interaction between two or more entities such as businesses, where although the entities may maintain a variety of interactions or may conduct business transactions between one another, the entities nevertheless operate in accordance with their own set of business rules and/or operating policies.

In accordance with one embodiment of the invention, facilities are provided such that third-party entities can participate in the content authorization and delivery process described herein. Such participation may occur upstream in the resource delivery process where the third-party provides authorization/authentication services to authorize/authenticate requesters of media resources, or downstream in the resource delivery process where the third-party stores and delivers the requested media resource. By providing authorization/authentication services for example, a third-party may operate an e-commerce web site where the third party offers their own content and merchandise branding, as well as links to content hosted by another entity. Moreover, by participating in the resource delivery process, a third-party may take advantage of the large distribution networks offered by the content provider while continuing to store and host their own content.

FIG. 7 illustrates an example environment to facilitate multiple entity control of access restrictions for media playback, in accordance with one embodiment of the invention. In addition to server 702 and client 110, FIG. 7 further includes content server 760, which is equipped to store (i.e. host) media resources 725 for delivery to e.g. client 110. In accordance with one embodiment, server 702 is further equipped with token generation logic 745 for use in indicating to a third-party whether a particular requestor is authorized by the first entity to access a requested media resource stored on third-party content server 760. In one embodiment, server 702 generates (e.g. via token generation logic 745) an obfuscated token in accordance with a qualification specification mutually recognized by both server 702 and content server 760. In one embodiment the qualification specification is third-party specific and may specify how one or more tokens or identifiers are to be generated such that a third-party may independently validate a token when received as part of a media resource request. In one embodiment, content server 760 is equipped with complementary token validation/authorization logic 762 to validate tokens received in association with media resource requests, and deliver or provide access to the requested media resource upon authentication of the requestor and/or through e.g. successful validation of the token.

In one embodiment, such a validation process may include the independent generation of an obfuscated token using one or more dynamically ascertained request-specific and/or requestor-specific attributes, and comparing the independently generated token with the obfuscated token received in the media resource request. For example, server 760 may dynamically identify one or more requestor specific attributes such as the requestor's network address, and compare the attributes to this represented by the token in accordance with the shared qualification specification. If the two tokens are deemed to be equivalent (whether exactly or within an acceptable margin of error), the requester may be considered authenticated and server 760 may deliver the requested media resource to the requester.

Example Operational Flow

In one embodiment of the invention, client 110 may generate a media resource request and transmit the request to server 702. In one embodiment the media resource request may indicate a content class to which the requested media resource is associated and one or more requestor-specific attributes. The requestor-specific attributes may include, but are not limited to the name of the requesting user, the network address of the user's client, the type and version of user agent employed, authorization information such as passwords and encryption keys, requestor entitlements/authorizations including content control attributes, and so forth.

In one embodiment, server 702 may access a data structure such as table 600 to identify a network address for an appropriate third-party host server for the requested media resource. For example, if a media resource request including a URL such as "start.real.com/rd?pid=CNN_222&URL=foo.smi" were to be received by server 702, where "CNN_222" represents a content/partner identifier and "foo.smi" represents the requested media resource, server 702 may access table 600 using "CNN_222" to identify a host address of "media.cnn.com" for the requested media resource. Thereafter, server 702 may generate a response including a URL such as "rtsp://media.cnn.com/foo.smi" or "http://media.cnn.com/foo.smi" depending e.g. upon whether the requested media resource is to be streamed to the requestor. The URL may further include a token generated in accordance with a qualification specification determined based on the identified "media.cnn.com" host address. As described above, the token may include a variety of attributes including content control attributes to indicate to the third-party whether the user has authorized a class of content associated with the requested media resource (e.g. as determined by the "CNN_222" content identifier) to be delivered to the requester. Thereafter, the response including the token-equipped URL may be provided to the in association with a redirection request.

For example, in response to an HTTP based media resource request received from a requester, server 702 may issue an HTTP response that includes a status code (such as 302, 303, 307 and so forth as defined in at least the following "Request for Comments" documents available from 'http://www.rfc-editor.org': RFC 1945, RFC 2616 and RFC 2068) indicating to the requestor that the requested resource temporarily resides under a different URL as indicated in the response. The requestor (e.g. client 110) may then resubmit the token-equipped request to the identified third-party server corresponding to the URL included in the response to facilitate delivery/retrieval of the requested media resource.

Example Client/Server Architecture

Figure 8:
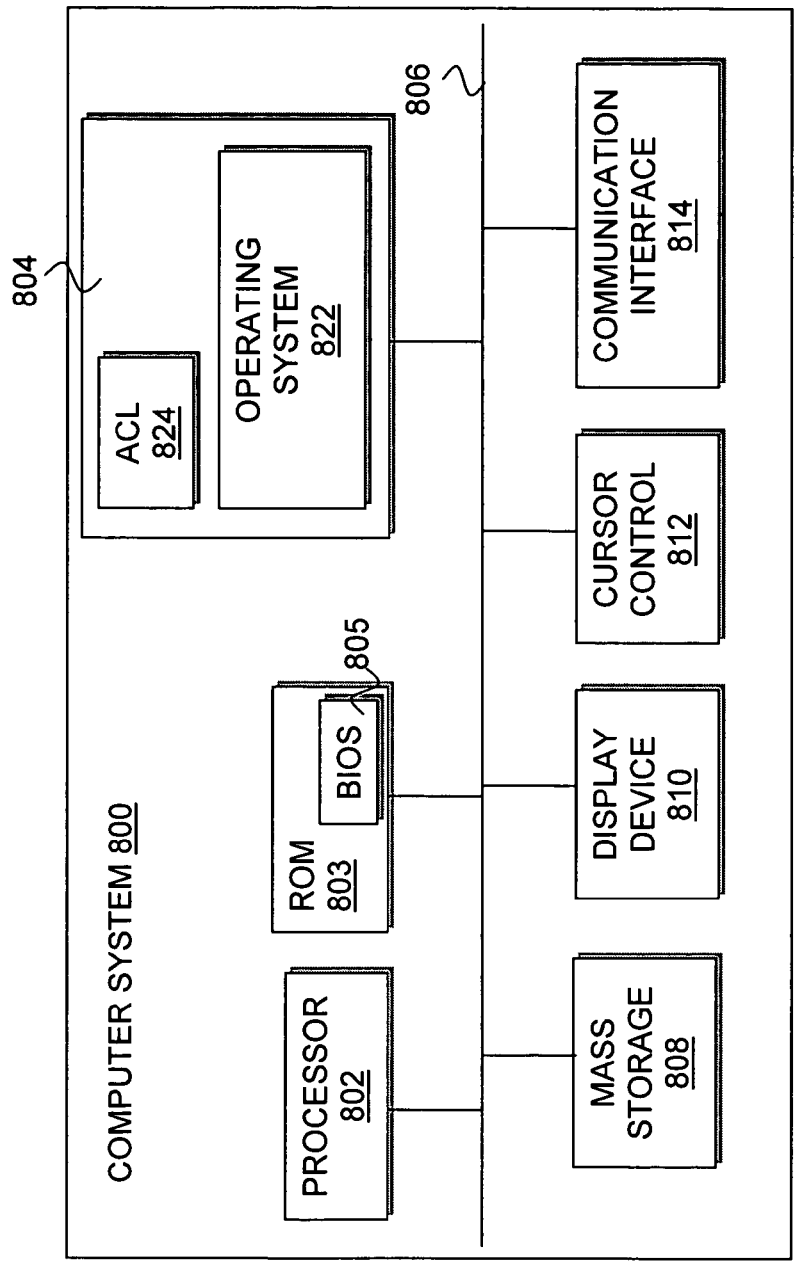
FIG. 8 illustrates an example computer system suitable for practicing the present invention.

FIG. 8 illustrates an example computer system suitable for practicing the present invention. As shown, example computer system 800 includes processor 802, ROM 803 including basic input/output system (BIOS) 805, and system memory 804 coupled to each other via "bus" 806. Also coupled to "bus" 806 are non-volatile mass storage 808, display device 810, cursor control device 812 and communication interface 814. During operation, memory 804 may include working copies of operating system 822, and access control logic (ACL) 824 of the present invention to facilitate access restriction control for media playback.

Except for the teachings of the present invention as incorporated herein, each of these elements may represent a wide range of these devices known in the art, and otherwise performs its conventional functions. For example, processor 802 may execute programming instructions of operating system 822 and sample processing logic 824, including those implementing the teachings of the present invention. ROM 803 may be EEPROM, Flash and the like, and memory 804 may be SDRAM, DRAM and the like. Bus 806 may be a single bus or a multiple bus implementation. In other words, bus 806 may include multiple properly bridged buses of identical or different kinds, such as Local Bus, VESA, ISA, EISA, PCI and the like.

Mass storage 808 may represent disk drives, CDROMs, DVD-ROMs, DVD-RAMs and the like. Typically, mass storage 808 includes the permanent copy of operating system 822 and access control logic 824. The permanent copy may be downloaded from a distribution server through a data network (such as the Internet), or installed in the factory, or in the field. For field installation, the permanent copy may be distributed using one or more articles of manufacture such as diskettes, CDROM, DVD and the like, having a recordable medium including but not limited to magnetic, optical, and other mediums of the like.

Display device 810 may represent any of a variety of display types including but not limited to a CRT and active/passive matrix LCD display, while cursor control 812 may represent a mouse, a touch pad, a track ball, a keyboard, and the like to facilitate user input. Communication interface 814 may represent a modem interface, an ISDN adapter, a DSL interface, an Ethernet or Token ring network interface and the like.

Epilog

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A computer implemented method comprising:
    obtaining at a media server from a remote client device a media resource request identifying a first media resource associated with one or more content attributes, the media resource request further identifying one or more user-stipulated content control attributes of a content control profile defining one or more user-defined classes of content that are authorized to be delivered to the client device for rendering by the client device, the one or more user-stipulated content control attributes of the content control profile having been generated by the client device;

the media server determining whether first media resource is associated with a user-defined class of content that has been authorized for delivery to the client device, based at least in part upon the one or more content attributes associated with the first media resource and the one or more user-stipulated content control attributes of the content control profile; and the media server delivering the first media resource to the client device for rendering by the client device if the first media resource is associated with the user-defined class of content that has been authorized for delivery to the client device, wherein said first media resource comprises at least one of audio and visual media content.

2. The method of claim 1, wherein the content control profile is defined via said remote client device and stored on said media server.

3. The method of claim 1, further comprising:
storing a local representation of the content control profile on the client device, wherein the a local representation includes at least the one or more user-stipulated content control attributes of the content control profile.

4. The method of claim 3, wherein the local representation is stored on the client device in the form of one or more HTTP cookies.

5. The method of claim 1, wherein delivering the first media resource to the client device comprises streaming the first media resource to the client device.

6. The method of claim 1, wherein the content control profile comprises one or more user-stipulated content qualifications that in combination define the one or more user-defined classes of content based on a plurality of granular qualification options.

7. The method of claim 6, wherein the user-stipulated content qualifications are selected from the plurality of granular qualification options including a first granular qualification option to authorize all of a given content type to be accessed by the client device, a second granular qualification option to authorize some of the given content type to be accessed by the client device, and a third granular qualification option to authorize none of the given content type to be accessed by the client device.

8. The method of claim 7, wherein the one or more user-defined classes of content comprise sexually explicit content, objectionable language, and violence.

9. A computer implemented method comprising:
receiving at a media server from a remote client device a network request identifying a requested media resource, the media resource request further identifying one or more user-stipulated content control attributes of a remotely defined user-stipulated content control profile defining one or more user-defined classes of media that a user of the remote client device has authorized for delivery to the client device for rendering by the client device;

determining, based at least in part upon the one or more content attributes associated with the requested media resource and the one or more user-stipulated content control attributes, whether the requested media resource belongs to the one or more user-defined classes of media that has been authorized by the user for delivery to the client device; and the media server delivering the requested media resource to the client device for rendering by the client device if it is determined that the requested media resource belongs to the one or more user-defined classes of media that the user of the client device has authorized for delivery to the client device, wherein said requested media resource comprises at least one of audio and visual media content.

10. The method of claim 9, further comprising:
delivering a secondary media resource if it is determined that the requested media resource does not belong to the one or more user-defined classes of media that has been authorized for delivery to the client device.

11. The method of claim 9, wherein the content control profile comprises one or more user-stipulated content qualifications that in combination define the one or more user-defined classes of media based on a plurality of granular qualification options.

12. A computer implemented method comprising:
receiving a network request from a remote client device, the request identifying a requested media resource, a host identifier indicating a host of the requested media resource, and one or more user-stipulated content control attributes of a remotely defined user-stipulated content control profile defining one or more user-defined classes of media that a user of the remote client device has authorized for delivery to the client device for rendering by the client device;

determining, whether the requested media resource belongs to the one or more user-defined classes of media that have been authorized by the user for delivery to the client device, based at least in part upon one or more content attributes associated with the requested media resource and the one or more user-stipulated content control attributes; and facilitating delivery of the requested media resource to the client device for rendering by the client device if it is determined that the requested media resource belongs to the one or more user-defined classes of media that the user of the client device has authorized for delivery to the client device, wherein said requested media resource comprises at least one of audio and visual media content.

13. The method of claim 12, further comprising:
facilitating access to a secondary media resource if it is determined that the requested media resource does not belong to the one or more user-defined classes of media that have been authorized for delivery to the client device.

14. The method of claim 12, further comprising:
determining whether the client device is entitled to access the media resource based at least in part upon the host identifier; and facilitating delivery of the requested media resource to the client device if it is determined that the client device is entitled to access the requested media resource and the requested media resource is authorized for delivery to the client device.

15. The method of claim 14, wherein facilitating delivery of the requested media resource comprises:
generating an obfuscated token including at least a subset of the one or more content control attributes; and providing the token to the host of the requested media resource to facilitate authentication of the user by the host of the requested media resource.

16. The method of claim 12, wherein the content control profile comprises one or more user-stipulated content qualifications that in combination define the one or more user-defined classes of media based on a plurality of granular qualification options.

17. The method of claim 16, wherein the user-stipulated content qualifications are selected from the plurality of granular qualification options including a first granular qualification option to authorize all of a given content type to be accessed by the client device, a second granular qualification option to authorize some of the given content type to be accessed by the client device, and a third granular qualification option to authorize none of the given content type to be accessed by the client device.

18. The method of claim 17, wherein the one or more user-defined classes of media comprise sexually explicit content, objectionable language, and violence.

19. The method of claim 12, wherein facilitating delivery of the requested media resource comprises:
  determining a network address for the host of the requested media resource based upon the media resource host identifier;
  generating an authentication token based upon one or more of the user-stipulated content control profile attributes; and
  redirecting the network request of the client device to the host of the requested media resource based upon the determined network address, wherein the redirected network request includes the authentication token.

20. An apparatus comprising:
  a receiver operative to receive a network request from a remote client device, the request identifying a requested media resource, and one or more user-stipulated content control attributes of a remotely defined user-stipulated content control profile defining one or more user-defined classes of media that a user of the remote client device has authorized for delivery to the client device for rendering by the client device;
  authorization logic operative to determine, based at least in part upon one or more content attributes associated with the requested media resource and the one or more user-stipulated content control attributes, whether the requested media resource belongs the one or more user-defined classes of media that have been authorized by the user for delivery to the client device; and
  delivery logic operative to deliver the requested media resource to the client device for rendering by the client device if it is determined that the requested media resource belongs to the one or more user-defined classes of media that the user of the client device has authorized for delivery to the client device, wherein said requested media resource comprises at least one of audio and visual media content.

21. The apparatus of claim 20, wherein the delivery logic is further operative to deliver a secondary media resource if it is determined that the requested media resource does not belong to the one or more user-defined classes of media that has been authorized for delivery to the client device.

22. The apparatus of claim 20, wherein the content control profile comprises one or more user-stipulated content qualifications that in combination define the one or more user defined classes of media based on a plurality of granular qualification options.

23. An apparatus comprising:
  a receiver operative to receive a network request from a remote client device, the request identifying a requested media resource, a host identifier indicating a host of the requested media resource, and one or more user-stipulated content control attributes of a remotely defined user-stipulated content control profile defining one or more user-defined classes of media that a user of the remote client device has authorized for delivery to the client device for rendering by the client device;
  authorization logic to determine, based at least in part upon one or more content attributes associated with the requested media resource and the one or more user-stipulated content control attributes, whether the requested media resource belongs to the one or more user-defined classes of media that have been authorized by the user for delivery to the client device; and
  delivery logic to facilitate delivery of the requested media resource to the client device for rendering by the client device if it is determined that the requested media resource belongs to the one or more user-defined classes of media that the user of the client device has authorized for delivery to the client device, wherein said requested media resource comprises at least one of audio and visual media content.

24. The apparatus of claim 23, wherein the delivery logic is further operative to facilitate access to a secondary media resource if it is determined that the requested media resource does not belong to the one or more user-defined classes of media that has been authorized for delivery to the client device.

25. The apparatus of claim 23, further comprising:
  logic operative to determine a network address for the host of the requested media resource based upon the media resource host identifier, to generate an authentication token based upon one or more of the content control profile attributes, and to redirect the network request of the client device to the host of the requested media resource based upon the determined network address, wherein the redirected network request includes the authentication token.

26. A non-transitory recordable medium having instructions stored thereon, which when executed, implement a method comprising:
  receiving a network request from a remote client device, the request identifying a requested media resource and one or more user-stipulated content control attributes of a remotely defined user-stipulated content control profile defining one or more user-defined classes of media that a user of the remote client device has authorized for delivery to the client device for rendering by the client device, the one or more user-stipulated content control attributes of the user-stipulated content control profile having been generated by the client device;
  determining, based at least in part upon one or more content attributes associated with the requested media resource and the one or more user-stipulated content control attributes, whether the requested media resource belongs to the one or more user-defined classes of media that has been authorized by the user for delivery to the client device; and
  delivering the requested media resource to the client device for rendering by the client device if it is determined that the requested media resource belongs to the one or more user-defined classes of media that the user of the client device has authorized for delivery to the client device, wherein said requested media resource comprises at least one of audio and visual media content.

27. The recordable medium of claim 26, wherein the method further comprises:
  delivering a secondary media resource if it is determined that the requested media resource does not belong to the one or more user-defined classes of media that has been authorized for delivery to the client device.

28. The recordable medium of claim 26, wherein the content control profile comprises one or more user-stipulated content qualifications that in combination define the one or more user-defined classes of media based on a plurality of granular qualifications options.

29. A non-transitory recordable medium having instructions stored thereon, which when executed, implement a method comprising:
   receiving a network request from a remote client device, the request identifying a requested media resource, a host identifier indicating a host of the requested media resource, and one or more user-stipulated content control attributes of a user-stipulated content control profile defining one or more classes of media that a user of the remote client device has authorized for delivery to the client device for rendering by the client device;
   determining, based at least in part upon one or more content attributes associated with the requested media resource and the one or more user-stipulated content control attributes, whether the requested media resource belongs to the one or more classes of media that have been authorized by the user for delivery to the client device; and
   facilitating delivery of the requested media resource to the client device for rendering by the client device if it is determined that the requested media resource belongs to the one or more classes of media that the user of the client device has authorized for delivery to the client device, wherein said requested media resource comprises at least one of audio and visual media content.

30. The recordable medium of claim 29, wherein the method further comprises:
   facilitating access to a secondary media resource if it is determined that the requested media resource does not belong to the one or more classes of media that have been authorized for delivery to the client device.

31. The recordable medium of claim 29, wherein the method further comprises:
   determining whether the client device is entitled to access the media resource based at least in part upon the host identifier; and
   facilitating delivery of the requested media resource to the client device if it is determined that the client device is entitled to access the media resource and the requested media resource is authorized for delivery to the client device.

32. The recordable medium of claim 31, wherein facilitating delivery of the requested media resource comprises:
   generating an obfuscated token including at least a subset of the one or more content control attributes; and
   providing the token to the host of the requested media resource to facilitate authentication of the user by the host of the requested media resource.

33. The recordable medium of claim 29, wherein the content control profile comprises one or more user-stipulated content qualifications that in combination define the one or more user-defined classes of media based on a plurality of granular qualification options.

34. The recordable medium of claim 33, wherein the user-stipulated content qualifications are selected from the plurality of granular qualification options including a first granular qualification option to authorize all of a given content type to be accessed by the client device, a second granular qualification option to authorize some of the given content type to be accessed by the client device, and a granular qualification third option to authorize none of the given content type to be accessed by the client device.

35. The recordable medium of claim 34, wherein the one or more user-defined classes of media comprise sexually explicit content, objectionable language, and violence.

36. The recordable medium of claim 29, wherein facilitating delivery of the requested media resource comprises:
   determining a network address for the host of the requested media resource based upon the media resource host identifier;
   generating an authentication token based upon one or more of the content control profile attributes; and
   redirecting the network request of the client device to the host of the requested media resource based upon the determined network address, wherein the redirected network request includes the authentication token.

37. A computer implemented method comprising:
   defining by a client rendering device via a remote user account a user-specific content control profile defining one or more user-defined classes of content that are authorized to be delivered to a the client rendering device for rendering by the client rendering device;
   generating by the client rendering device a media resource request identifying a first media resource associated with one or more content attributes, and one or more attributes of the user-specific content control profile; and
   receiving by the client rendering device the first media resource if it is determined based at least in part upon the one or more attributes associated with a user-defined class of content and the one or more attributes of the user-specific content control profile that the user of the client rendering device has authorized the first class of content for delivery to the client rendering device, wherein said requested media resource comprises at least one of audio and visual media content.

38. The method of claim 37, further comprising:
   storing a local representation of the user-specific content control profile on the client rendering device, wherein the local representation includes at least the one or more attributes of the user-specific content control profile.

39. The method of claim 37, wherein the content control profile comprises one or more user-stipulated content qualifications that in combination define the one or more classes of user-defined content based on a plurality of granular qualification options.

40. The method of claim 37, wherein the remote user account is accessed via a first remote server and the first media resource is received from a second remote server.

* * * * *